May 25, 1926.　　　　　　　　　　　　　　　1,586,476
E. E. SIMPSON
NONCOLLAPSIBLE FLOAT FOR LIQUID LEVEL CONTROLS
Filed May 4, 1925
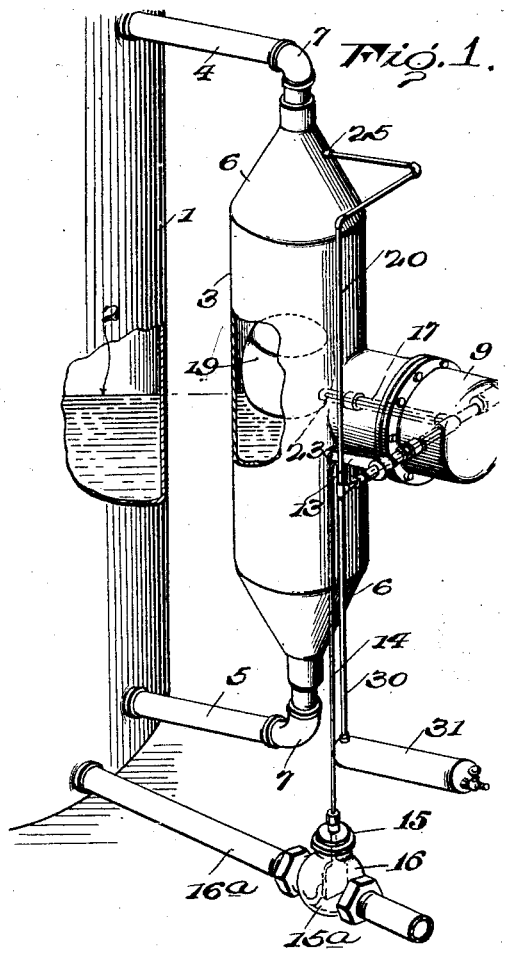
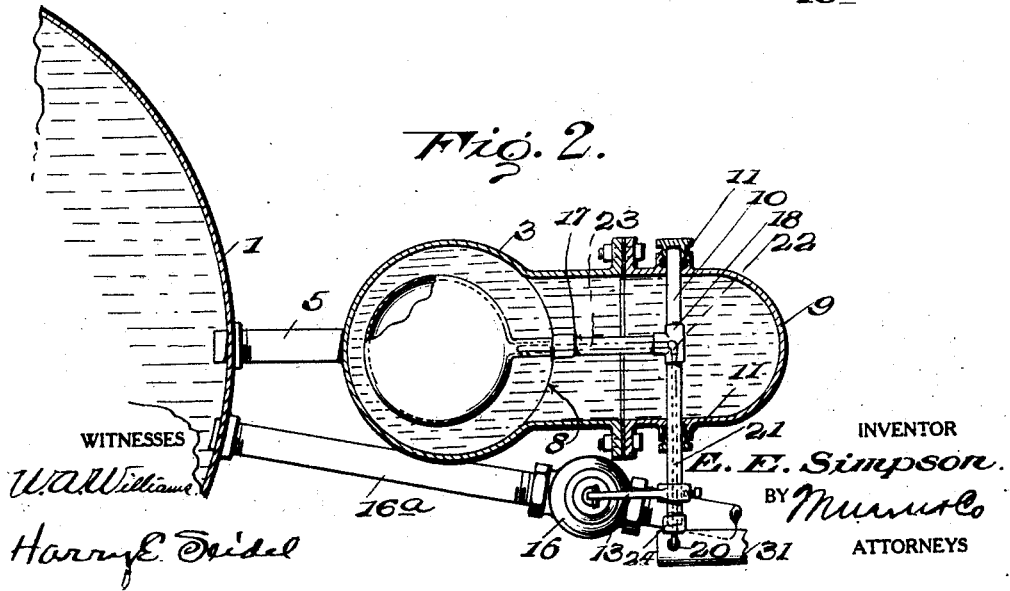
WITNESSES
U. A. Williams
Harry E. Seidel
INVENTOR
E. E. Simpson
BY Munn & Co
ATTORNEYS Patented May 25, 1926.

1,586,476

UNITED STATES PATENT OFFICE.

EDWARD EVERETT SIMPSON, OF TULSA, OKLAHOMA.

NONCOLLAPSIBLE FLOAT FOR LIQUID-LEVEL CONTROLS.

Application filed May 4, 1925. Serial No. 27,887.

This invention relates to floats of the noncollapsible type.

In the oil and other industries it is necessary to control the level of liquids adapted to be held in containers and floats normally constructed for the purpose are frequently subjected to pressure and since such floats are air-filled or of the vacuum type they frequently fail to rise and fall automatically as the liquid falls below or rises above a predetermined height.

An object of the present invention is the provision of a device in which a float is provided which may be employed in containers in which a pressure is used which is greater than atmospheric pressure and which will not be affected in the usual manner so that the valve for controlling the inflow of liquids will always be closed when the liquid in the container reaches a predetermined height.

A further object of the invention is the provision of a float in which a pressure is maintained within the same which is approximately equal to the pressure in the container in which the float is operated.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a plan view of the same.

Figure 2 is a detail in perspective showing the operating mechanism for maintaining the float in communication with the tank per se.

Referring more particularly to the drawings, 1 designates a container which is adapted to be filled with a liquid designated by the line 2 which has a level at a predetermined height and which is adapted to be maintained at such height by controlling the valve for admitting the liquid by means of the device constructed in accordance with the principles of my invention. An auxiliary container is shown at 3 which is connected at its top and bottom respectively by means of the conduits 4 and 5. The auxiliary container 3 is substantially cylindrical in shape but has its ends 6 conically formed and connected to elbows 7 with the respective conduits 4 and 5.

The auxiliary container has an opening 8 to which is connected a casing 9 projecting laterally from the container 3 and is closed to the atmosphere as is the container 3. A shaft 10 is mounted in bearings 11 formed in the side walls of the casing 9 and has its outer end, as shown at 12, projecting beyond said casing and bearings. A lever 13 is rigidly connected with the shaft 10 and has on its outer end a depending link 14 which passes through the usual glands 15 of a valve casing 16 in which is mounted a valve 15ᵃ and controlled by the movement of the link 14. The valve casing is included in an inlet pipe 16ᵃ connected to the tank or container 1.

A hollow rod 17 is connected, as shown at 18, to the hollow shaft 10 and in open communication with said shaft. A float 19 is connected to the outer end of the rod 17 and is placed in communication with a conduit 20 by means of a pipe 21 which passes directly through the hollow shaft 10 and is provided with an elbow 22 where a pipe 23 passing through the hollow rod 17 places the float 19 in direct communication with the conduit 20. A swing connection or universal joint 24 is provided on the end of the shaft 10 where the pipe 20 is connected with the pipe 21 so that the pipe 21 may be revolved with the shaft 10 when the float 19 is elevated and when said float is elevated the link 14 is drawn upwardly closing the valve in the casing 16.

As the liquid level in the container 3 is lowered the float will be lowered and cause the link 14 to open the valve in said casing in order to permit a sufficient quantity of liquid to enter the container 1 in order to maintain the desired level. The pipe 20 is connected, as shown at 25 to the upper conical portion 6 of the auxiliary tanks 3 and above the level of the liquid in the auxiliary container and likewise in the main tank 1.

It will be seen by this construction that the interior of the float 19 is maintained at substantially the same pressure as is had in the upper portion of the containers 1 and 3 so that a greater pressure in the containers will not affect the proper operation of the float.

A drain pipe 30 is connected to the union 24 and to a container 31 so that any moisture that happens to enter the float may be readily discharged therefrom through the hollow pipes 21 and 23 and the pipe 30.

What I claim is:

1. In a device of the class described, an auxiliary container having its opposite ends in open communication with the opposite ends of a main container, said auxiliary container provided with a casing at one side in open communication with said auxiliary container, a hollow shaft mounted for rocking movement in said casing and having one end projecting beyond said casing, a lever connected with the projected end of the shaft, a valve for controlling the flow of liquid to the main container, a link for connecting the lever with said valve, a float adapted to be supported by the liquid in the auxiliary container, a hollow rod connecting the float with the hollow shaft, and conduits connecting the float with the upper end of the auxiliary container, a portion of said conduit passing through the hollow rod and hollow shaft, and means for draining moisture from the float.

2. In a device of the class described, an auxiliary container having its opposite ends in open communication with the opposite ends of a main container, said auxiliary container provided with a casing at one side in open communication with said auxiliary container, a hollow shaft mounted for rocking movement in said casing and having one end projecting beyond said casing, a lever connected with the projected end of the shaft, a valve for controlling the flow of liquid to the main container, a link for connecting the lever with said valve, a float adapted to be supported by the liquid in the auxiliary container, a hollow rod connecting the float with the hollow shaft, and conduits connecting the float with the upper end of the auxiliary container, a portion of said conduit passing through the hollow rod and hollow shaft, the portion of the conduit in the hollow shaft having a universal connection with the conduit connecting the hollow shaft with the upper end of the container, and a drain attached to the universal connection for permitting moisture that is collected in the float to be discharged therefrom.

EDWARD EVERETT SIMPSON.